United States Patent

[11] 3,573,553

[72] Inventor Gerhard O. Mietz
 Somersworth, N.H.
[21] Appl. No. 735,827
[22] Filed June 10, 1968
[45] Patented Apr. 6, 1971
[73] Assignee General Electric Company

[54] POWER SUPPLY PROTECTOR WITH RESET MEANS
 4 Claims, 3 Drawing Figs.
[52] U.S. Cl. ................................... 317/22,
 317/33, 317/31
[51] Int. Cl. ........................................ H02h 3/24,
 H02h 5/00
[50] Field of Search ........................... 317/22, 33,
 33 (XR), 31; 323/9, 22, 22 (T)

[56] References Cited
UNITED STATES PATENTS
3,122,697 2/1964 Kauders ................... 323/9X
3,473,106 10/1969 Grabl ....................... 317/31X
3,235,787 2/1966 Gordon ..................... 323/22T
3,240,997 3/1966 Burgi ........................ 317/33
3,426,265 2/1969 Till ........................... 317/22X Primary Examiner—J. D. Miller
Assistant Examiner—Harvey Fendelman
Attorneys—Francis X. Doyle, Vale P. Myles, Frank L. Neuhauser, Oscar B. Waddell and Melvin M. Goldenberg ABSTRACT: An electronic control protector system electrically positioned between a DC source and the regulator controls of a DC voltage regulator to reduce conduction of the regulator transistor when the current drawn to the load becomes excessive. The electronic control includes a bypass transistor maintained nonconducting in normal operation. Excess current flow, as indicated by a voltage drop across the load, causes the bypass transistor to conduct and reduce conduction of the regulator transistor. Reset means are provided to provide a short pulse to cut off the bypass transistor allowing normal operation of the regulator. If excess current is still flowing, the bypass transistor will again be rendered conducting to reduce conduction of the regulator transistor.

Patented April 6, 1971 3,573,553

Inventor,
Gerhard O. Mietz,
by Francis K. Doyle
His Attorney

POWER SUPPLY PROTECTOR WITH RESET MEANS

BACKGROUND OF THE INVENTION

This invention relates to a regulated DC power supply and, more particularly, to a protective device for preventing damage to the regulator and having reset means.

In many regulated power supplies, fuses or similar overcurrent devices are provided which remove the power source from the load in the event of excess current flowing into the load. These types of overcurrent protective devices are considered too slow in acting to prevent damage to transistor circuits. Also, they have the disadvantage of removing the power source from the load. Electronic protection systems have been proposed to provide a sufficiently fast response time to prevent damage to the transistor circuits. However, these devices operate to remove the source from the load and thus are undesirable in circuits where it is considered necessary to maintain continuous energy to the load.

Therefore, it is one object of this invention to provide an electronic control system to protect DC regulators.

A further object of this invention is to provide an electronic protector system which will continuously maintain the source connected to the load.

A still further object of this invention is to provide an electronic protector system which will reduce conduction of the regulator transistor when excess current flows in the load.

A still further object of this invention is to provide an electronic protector system which may be automatically or manually reset but which will again operate to reduce conduction of the regulator transistor if excess current still flows in the load after reset.

SUMMARY OF INVENTION

Briefly in one form the protector system of this invention comprises a bypass transistor connected in circuit to reduce conduction of the regulator transistor of a DC power supply. The bypass transistor is maintained in a nonconducting state during normal operation of the circuit. When excess current flows in the load, the bypass transistor is turned on, thereby conducting, to reduce conduction of the regulator transistor. Means are included to provide a pulse of short duration to the bypass transistor, after the transistor has been rendered conducting, to turn such bypass transistor off and allow normal operation of the circuit. If excess current continues to flow, the bypass transistor will again be turned on to reduce conduction of the regulator transistor.

The invention sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment particularly when considered in the light of the accompanying drawing.

DESCRIPTION OF PREFERRED EMBODIMENT

Figure 1:
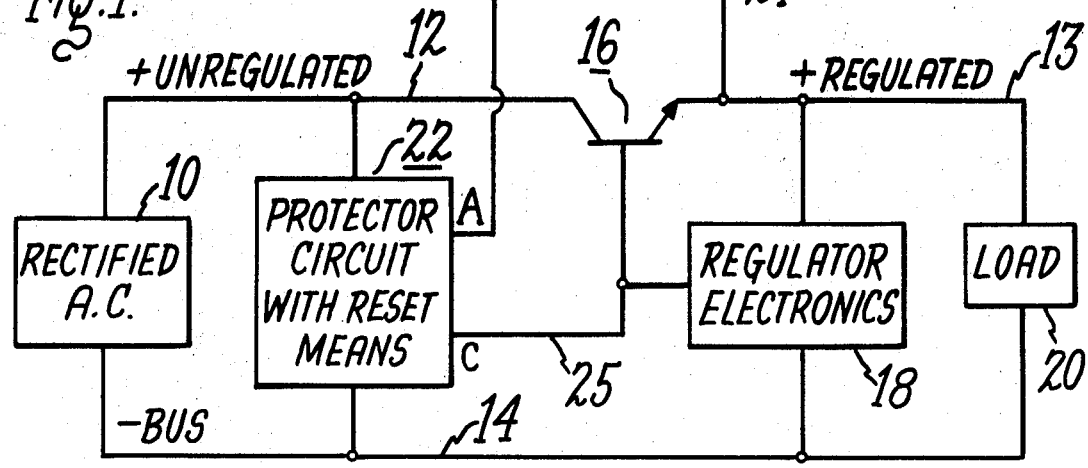
FIG. 1 is a schematic diagram of a DC power supply circuit showing the protector of this invention connected thereto.

The invention disclosed herein is a protector and reset circuit for a regulated DC power supply to prevent damage to the regulator transistor of the regulator circuit. FIG. 1 shows schematically a power supply 10 indicated as a rectified AC source. Of course, it will be apparent to those skilled in the art that any type of DC power supply source may be provided. The unregulated DC power is carried by lines 12 and 14 to the regulator transistor 16 and the regulator electronics 18. As is well understood by those skilled in the art, transistor 16 and regulator electronics 18 provide a regulated power to a load 20. When the load 20 increases, more current is drawn in the circuit to maintain the voltage across the load 20. As is well understood, excess current will damage the regulator transistor 16 which in turn will result in a malfunction of the regulator and may also damage the load 20. To protect the transistor 16 from excess current and also to provide continuous power to the load 20 a protector circuit and reset means 22 is provided connected to the unregulated DC power as shown in FIG. 1. As there shown, a line 24 is provided from the protector circuit 22 bypassing transistor 16. Thus when excess current flows, as indicated by a voltage drop across the load 20, the protector circuit 22 controls, through line 25, the reduction of the current flow through transistor 16, thereby preventing excess current from flowing through transistor 16.

Figure 2:
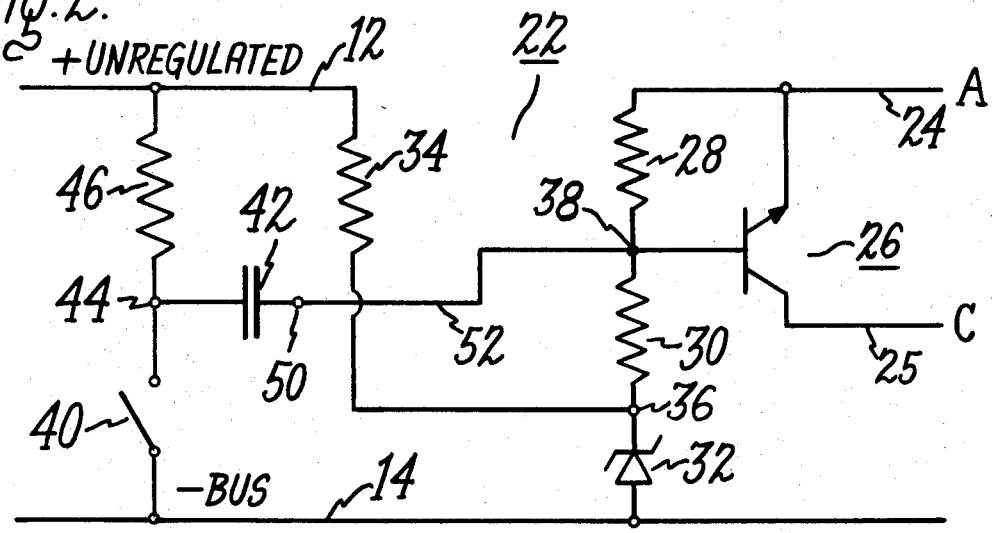
FIG. 2 is a schematic diagram of one form of protector and reset circuit according to this invention.

A preferred form of the protector circuit and reset means 22 is shown in FIG. 2 to which reference will not be made. As shown in FIG. 2, the protector circuit with reset means 22 includes a transistor 26 connected to a voltage divider network including resistors 28, 30 and a Zener diode 32. As can be seen, the junction 36 between resistor 30 and Zener diode 32 is connected to the unregulated bus 12 through a resistor 34. As will be understood by those skilled in this art, under normal conditions current flows from bus 12 through resistor 34 and Zener diode 32 thereby establishing a voltage at junction 36 equal to the voltage of the Zener diode 32. The top of the voltage divider network, comprising resistors 28, 30 and Zener diode 32, is connected to line 24 which is in turn, connected to the regulated bus 13. (FIG. 1). Since the voltage established on line 24 is larger than the voltage at junction 36, a current will flow through resistors 28 and 30. Current flow through these resistors will establish a potential at junction 38 which is less than the potential in line 24. Since junction 38 is connected to the base of transistor 26, voltage at point 38 will establish a back bias on the transistor 26, holding it nonconducting.

When the load 20 increases, thereby causing an increase in current, the potential both on line 24 and at junction 38 will decrease. The transistor 26 will remain back biased until the voltage at junction 38, less the voltage on line 24, is equal to the bias emitter voltage of the transistor 26, thereby permitting the transistor 26 to conduct. This is known as the break point of the transistor, as is well understood by those skilled in the art, and may be set as is desired by the proper selection of resistors 28, 30, Zener diode 32 and, of course, transistor 26. As will be understood, conduction of transistor 26 will establish a bypass over line 24 past the transistor 16 (FIG. 1). Of course, this bypass of transistor 16 will decrease the conduction of transistor 16 which will in turn reduce the voltage at the top of resistor 28. As will be understood, the voltage at junction 38 will soon equal the base emitter voltage of transistor 26 and the voltage at the top of resistor 28 will be very nearly equal to zero. This will provide an equilibrium, or a stable state, and the circuit will remain in this position regardless of any changes in the load. Thus, as can be seen, by means of the protector circuit 22 the regulator transistor 16 may be bypassed in the event of excess current and the bypass will continue in operation despite any changes in the load.

It is, of course, desirable that the protector device or circuit be provided with reset means such that, after a fault has occurred, the circuit may be reset to allow continued operation of the regulator. This reset function may be provided in the circuit shown in FIG. 2 by means of a reset button or switch 40, which is shown as normally open in FIG. 2. With the switch 40 in the normally open position, the capacitor 42 is essentially charged to the voltage at the junction 44 between resistor 46 and the switch 40. With switch 40 closed, one side of capacitor 42 is connected to the bus 14, thus substantially instantly reducing the voltage at junction 38 to very nearly the negative of the voltage at junction 44, for an extremely short duration. As will be understood, the duration of the pulse provided by the capacitor 42 depends primarily on resistors 30, 28 and capacitor 42. The pulse from capacitor 42 will turn off transistor 26 during the time of the pulse, thereby permitting transistor 16 to conduct again. If the fault has been cleared from the system, then the regulator operation will go back to normal and the transistor 26 will remain in the nonconducting state. However, if the fault has not cleared, then the excess current will continue to flow and the transistor 26 will again be turned on after the pulse from capacitor 42 has disappeared. Thus, the protector circuit may be reset as desired and after reset will immediately return to the nonconducting state. If the excess current still flows, or when excess current again flows, the circuit will again operate to reduce conduction of transistor 16.

Figure 3:
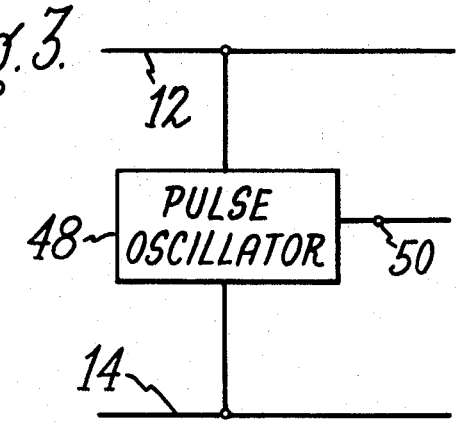
FIG. 3 is a schematic diagram of another form of reset means according to this invention.

Of course, it will be understood that the resetting of protector 22 may be provided automatically, if desired. As will be understood, an automatic reset mechanism could be provided by means of a pulse oscillator, such as, for example, the pulse oscillator 48 shown in FIG. 3 of the drawing. As is shown, the pulse oscillator is connected across the unregulated bus lines 12 and 14 and has one point connected to the junction 50, shown in FIG. 2. The junction 50 is connected to junction 38 by means of line 52, as is apparent from FIG. 2 of the drawing. The pulse oscillator 48 will provide a normal negative pulse, at regular intervals, to the transistor 26. As will be understood, under normal conditions, this will not alter the nonconducting condition of transistor 26. However, under a fault condition, where transistor 26 has been turned on, the pulse oscillator 48 will provide a pulse, which will turn off transistor 26, at regular intervals. As will be understood, this again allows transistor 16 to assume regular conduction. If a fault is present, then the transistor 26 will again start conduction as soon as the pulse from pulse oscillator 48 has disappeared. Thus the duration of the pulse is such that excess current may not flow for sufficient time in transistor 16 to damage the transistor. This automatic mechanism would be extremely useful for intermittent overloads, since the transistor 16 would be protected during the period of the overload but would be turned back on, automatically, as soon as the overload has been removed.

While there has been shown and described the present preferred embodiment of the power supply protector and reset mechanism of this invention, it will of course be understood by those skilled in the art that various changes may be made in details of the circuitry without departing from the spirit and scope of the invention particularly as such invention is set forth in the appended claims.

I claim:

1. A protector circuit and reset mechanism for use in a DC regulator for preventing damage to the regulator transistor wherein a resistance free electrical path is provided from the regulator transistor to a load, said protector circuit comprising, in combination:
    a. a bypass transistor connected in circuit with the regulator transistor to reduce conduction of the regulator transistor;
    b. a voltage divider including a Zener diode, a junction in said voltage divider connected to the base of said bypass transistor, said voltage divider providing a back bias to the base of said bypass transistor to render said bypass transistor nonconducting, one end of said voltage divider connected to the emitter of said bypass transistor; and
    c. means whereby overcurrent in said circuit decreases the base emitter voltage of said bypass transistor to render said bypass transistor conducting and thereby reducing conduction of the regulator transistor.

2. A power supply protector as set forth in claim 1 in which a reset mechanism is provided, said reset mechanism including means for providing a pulse to the base of said bypass transistor for turning said bypass transistor off after said bypass transistor has become conducting.

3. A power supply and protector circuit and reset means as set forth in claim 2 in which said reset means includes a charged capacitor and a switch for discharging said capacitor to provide said pulse of short duration for turning off said bypass transistor.

4. A power supply protector circuit and reset means as set forth in claim 2 in which said means for providing said pulse is a pulse oscillator connected to the base of said bypass transistor.